(12) United States Patent
Winkler et al.

(10) Patent No.: US 8,946,982 B2
(45) Date of Patent: Feb. 3, 2015

(54) COATED PHOSPHOR PARTICLES WITH REFRACTIVE INDEX ADAPTION

(75) Inventors: Holger Winkler, Darmstadt (DE);
Reinhold Rueger, Roedermark (DE)

(73) Assignee: Merck Patent GmbH, Darmstadt (DE)

(*) Notice: Subject to any disclaimer, the term of this patent is extended or adjusted under 35 U.S.C. 154(b) by 505 days.

(21) Appl. No.: 12/742,290

(22) PCT Filed: Oct. 14, 2008

(86) PCT No.: PCT/EP2008/008685
§ 371 (c)(1),
(2), (4) Date: May 11, 2010

(87) PCT Pub. No.: WO2009/062579
PCT Pub. Date: May 22, 2009

(65) Prior Publication Data
US 2010/0283076 A1     Nov. 11, 2010

(30) Foreign Application Priority Data
Nov. 12, 2007   (DE) .......................... 10 2007 053 770

(51) Int. Cl.
*H01J 63/04*  (2006.01)
*C09K 11/08*  (2006.01)
*C09K 11/02*  (2006.01)
*C09K 11/68*  (2006.01)

(52) U.S. Cl.
CPC .............. *C09K 11/08* (2013.01); *C09K 11/025* (2013.01); *C09K 11/685* (2013.01)
USPC .................................. 313/486; 252/301.4 R

(58) Field of Classification Search
CPC ........ H01L 33/44; C09K 11/02; C09K 11/06; C09K 11/08; C09K 11/44; C09K 11/685; C09K 11/77; C09K 11/025
USPC ........ 257/98, E33.061; 252/301.4 R; 313/486
See application file for complete search history.

(56) References Cited

U.S. PATENT DOCUMENTS

| | | | |
|---|---|---|---|
| 5,702,519 | A | 12/1997 | Nitta et al. |
| 6,150,757 | A | 11/2000 | Ronda et al. |
| 8,088,304 | B2 | 1/2012 | Winkler |
| 2001/0033135 | A1* | 10/2001 | Duggal et al. ............... 313/506 |
| 2004/0043692 | A1 | 3/2004 | Kawamura et al. |
| 2004/0067355 | A1* | 4/2004 | Yadav et al. ................. 428/323 |
| 2004/0166320 | A1 | 8/2004 | Kobusch |
| 2006/0001352 | A1* | 1/2006 | Maruta et al. ............... 313/486 |

(Continued)

FOREIGN PATENT DOCUMENTS

| | | |
|---|---|---|
| DE | 10 2007 001 903 A1 | 5/2008 |
| EP | 0 415 469 A2 | 3/1991 |

(Continued)

OTHER PUBLICATIONS

International Search Report of PCT/EP2008/008685 (Feb. 2, 2009).

(Continued)

*Primary Examiner* — Andrew Coughlin
(74) *Attorney, Agent, or Firm* — Millen, White, Zelano & Branigan, P.C.

(57) ABSTRACT

The invention relates to coated phosphor particles comprising luminescent particles and at least one, preferably substantially transparent, metal, transition-metal or semimetal oxide coating, and to a process for the production thereof.

28 Claims, 4 Drawing Sheets

(56) References Cited

U.S. PATENT DOCUMENTS

| | | |
|---|---|---|
| 2006/0152139 A1 | 7/2006 | Hsieh et al. |
| 2007/0036988 A1 | 2/2007 | Tanaka et al. |
| 2007/0212541 A1 | 9/2007 | Tsukada |
| 2007/0278935 A1 | 12/2007 | Harada |
| 2008/0003160 A1 | 1/2008 | Kim et al. |
| 2008/0185600 A1* | 8/2008 | Thomas .......................... 257/98 |

FOREIGN PATENT DOCUMENTS

| | | |
|---|---|---|
| EP | 0 763 573 A2 | 3/1997 |
| EP | 1 350 829 A1 | 10/2003 |
| JP | 2003082342 | 3/2003 |
| JP | 2003082343 | 3/2003 |
| JP | 2007291389 | 11/2007 |
| JP | 2010520337 | 6/2010 |
| TW | 200637900 A | 11/2006 |
| WO | WO 98/37165 A1 | 8/1998 |
| WO | WO 2007102458 | 9/2007 |

OTHER PUBLICATIONS

Otani, Mitsuhiro et al. English Abstract JP 2003082342. Publication Date: Mar. 19, 2003. "Plasma Display Device". Application No. JP20010276299. Application Date: Sep. 12, 2001. (Espacenet).

Kawamura, Hiroyuki et al. English Abstract JP 2003082343. Publication Date: Mar. 19, 2003. "Plasma Display Device". Application No. JP20010276300. Application Date: Sep. 12, 2001. Applicant: Matsushita Electric Ind. Co. Ltd. (Espacenet).

Choi, Ick-Kyu, et al. English Abstract JP 2007291389. Publication Date: Nov. 8, 2007. "Phosphor for Plasma Display Panel and Plasma Display Panel Having Phosphor Layer Composed of the Phosphor". Application No. JP20070107690. Application Date: Apr. 17, 2007. Applicant: Samsung SDI Co Ltd. (Espacenet).

JP Publication No. JP 2010520337. Publication Date: Jun. 10, 2010. "New phosphor material having garnet structure, useful to convert blue or near UV emission of luminescence diode into visible white radiation, and in electroluminescent film, which is useful in e.g. liquid crystal display and automobiles" Application No. JP2009552084A. Application Date: Feb. 13, 2008. (Thomson Innovation Patent Record Full View).

Tsukada, Kazuya, et al. English Abstract WO 2007102458. Publication Date: Sep. 13, 2007. "Core-Shell Type Nanoparticle Phosphor". Application No. WO2007JP54167. Application Date: Mar. 5, 2007. Applicant: Konica Minolta Med & Graphic. (Espacenet).

English Translation Abstract of TW 2006037900 published Nov. 1, 2006.

* cited by examiner

COATED PHOSPHOR PARTICLES WITH REFRACTIVE INDEX ADAPTION

The invention relates to coated phosphor particles having an improved refractive index and to a process for the production thereof.

LED conversion phosphors, such as YAG:Ce, TAG:Ce, $Al_2O_3$:Ce, etc., have a high refractive index of about 1.8 or more. In the LED, the phosphors are usually embedded in a binder (usually silicone or epoxy resin); this mixture represents the conversion layer. The binders have a refractive index within a range from 1.4 to 1.5. The jump of 0.4 units in the refractive index between binder and phosphor results in a significant proportion of the light in the conversion layer being scattered at the binder/phosphor interface. This relates, in particular, both to the coupling-in of light, i.e. the light from the LED chip which is intended to excite the phosphor, and also to coupling-out, i.e. the fluorescence light which is generated within the phosphor and is intended to be emitted thereby. Considered overall, the large and abrupt refractive-index jump causes a reduction in the conversion efficiency since less excitation light interacts with the phosphor in the form of absorption. Furthermore, the fluorescence light generated in the phosphor is in the same way prevented from coupling out of the phosphor by total reflection. In the least favourable case, the light undergoing total internal reflection is absorbed at flaws and converted into heat and is thus no longer available for coupled-out fluorescence radiation taking place later. Once again, this reduces the efficiency of the phosphor.

In order to reduce these disadvantageous phenomena which impair the efficiency of the system as a whole, the refractive-index difference at the interface between binder and phosphor must be reduced or at least converted from a stepwise into a gradual transition.

In accordance with the prior art, it has been attempted to increase the refractive index of the binders by adding colourless microfine particles which have a high refractive index thereto. However, since the resultant effective refractive index of the binder is then given by the sum of the volumetrically averaged refractive indices of the binder and the high-refractive-index microfine particles, only an inadequately small increase in the refractive index is possible. This applies all the more as the concentration of the added microfine particles cannot be increased as desired since otherwise a disadvantageous change in the processing properties of the binder mixture occurs.

Another way of increasing the refractive index of the binder consists in integrating specific functional groups, in particular aromatics, into, for example, the silicone skeleton. However, this proves to be disadvantageous since the silicones modified in this way have lower radiation and heat resistance than unmodified silicones. Binders modified in this way cannot be used in high-power LEDs since degradation of the binder may occur after just a few hundred operating hours, which may be evident in the form of graying. This is inconsistent with the long lifetime of LED chips of up to 100,000 operating hours.

US 2007/0036988 discloses a glass coating of a ceramic comprising phosphor particles, where the phosphor particles have a particle size of between 50 and 250 nm, preferably 150 µm. The phosphor particles are produced by means of conventional solid-state synthesis ("mixing and firing").

U.S. Pat. No. 5,220,243 discloses a coating of ZnS-based phosphor particles, where the coating consists of trimethyl- or triethylaluminium and is applied to the phosphor particles by a CVD (chemical vapour deposition) process. CVD processes are very complex in terms of the process and apparatus: very high purities of the (inert) gas atmosphere are necessary throughout the process, and the flow must be designed in such a way that the individual gas streams can be fed homogeneously to the material to be coated.

The object of the present invention consisted in achieving an improvement in the coupling-in and out of light into and out of the phosphor without impairing other properties, such as, for example, the lifetime of the LED system.

Surprisingly, the object is achieved by converting a phosphor into a novel phosphor material which improves the coupling-in and out of light in a wet-chemical process with an inorganic coating. In the simplest case, this is a porous coating with a material of moderate or high refractive index.

The present invention thus relates to coated phosphor particles comprising luminescent particles and at least one metal, transition-metal or semimetal oxide coating obtainable by mixing at least two starting materials with at least one dopant and subsequent, preferably multistep, calcination to give phosphor particles, and coating with metal, transition-metal or semimetal oxides by wet-chemical methods and repeated calcination.

The metal, transition-metal or semimetal coating is preferably substantially transparent, i.e. it must ensure 90% to 100% transparency both for the excitation spectrum and also for the emission spectrum of the respective conversion phosphors employed. On the other hand, the transparency of the coating according to the invention can also be less than 90% to 100% for all wavelengths which do not correspond to the excitation and emission wavelengths.

Due to the increasing porosity in the coating towards the outside, the phosphor material according to the invention thus forming has an effective refractive index which decreases with increasing separation from the surface of the original phosphor (see FIGS. 1 and 2). The refractive index decreases constantly from the value of the bulk refractive index of the original phosphor to the refractive index of the binder (for example epoxy or silicone resin) by suspension of the novel phosphor material. No refractive-index jumps occur here, meaning that light scattering is reduced on passage through the binder/novel phosphor material interface. Entering and exiting light then no longer sees a sharp phase interface at which reflection can take place (see FIG. 2).

The term "porosity or porous" is taken to mean the average pore opening on the surface of a material. The coated phosphor surface according to the invention is preferably meso- or macroporous, where "mesoporous" describes a pore opening between 2 and 50 nm and "macroporous" describes a pore size >50 nm.

These porous coatings additionally offer the possibility of further reducing the refractive index of a single layer.

The particle size of the phosphors according to the invention is between 50 nm and 40 µm, preferably between 1 µm and 20 µm.

The thickness of the coating according to the invention is between 10 nm and 200 nm, preferably 15 nm and 100 nm. The particle size of the primary particles of the metal, transition-metal or semimetal oxide coating is between 5 nm and 50 nm.

The following compounds are particularly suitable as material for the phosphor particles according to the invention: $(Y,Gd,Lu,Sc,Sm,Tb,Th,Ir,Sb,Bi)_3(Al,Ga)_5O_{12}$:Ce (with or without Pr), $YSiO_2N$:Ce, $Y_2Si_3O_3N_4$:Ce, $Gd_2Si_3O_3N_4$:Ce, $(Y,Gd,Tb,Lu)_3Al_{5-x}Si_xO_{12-x}N_x$:Ce, $BaMgAl_{10}O_{17}$:Eu (with or without Mn), $SrAl_2O_4$:Eu, $Sr_4Al_{14}O_{25}$:Eu, $(Ca,Sr,Ba)Si_2N_2O_2$:Eu, $SrSiAl_2O_3N_2$:Eu, $(Ca,Sr,Ba)_2Si_5N_8$:Eu, $(Ca,Sr,Ba)SiN_2$:Eu, $CaAlSiN_3$:Eu, $(Ca,Sr,Ba)_2SiO_4$:Eu and other silicates, molybdates, tungstates, vanadates, group III nitrides, oxides, in each case individually or mixtures thereof with one or more activator ions, such as Ce, Eu, Mn, Cr, Tb and/or Bi.

In another preferred embodiment, the metal, transition-metal or semimetal oxide coating consists of at least two components A and B of different refractive index. The layer is constructed in such a way that a refractive-index gradient arises from inside to outside, with the higher refractive index on the inside and the lower refractive index on the outside. A coating of this type essentially consists of substance A having the higher refractive index on the surface of the phosphor particle and substance B having the lower refractive index on the outside of the coating. A mixture of A and B with a composition gradient is located in between.

Examples of A and B are:

$Al_2O_3$ and $SiO_2$, ZnO and $SiO_2$ or $ZrO_2$ and $SiO_2$

Examples of mixtures of more than two components are $ZnO_2$, $Al_2O_3$ and $SiO_2$ and $TiO_2$, $Al_2O_3$ and $SiO_2$. Preferred components for A and B are $Al_2O_3$ and $SiO_2$. The coating can be impermeable and continuous or porous, where the latter is preferred. It can be applied as a mixed precipitation of the components or alternating precipitation of the components. In a further embodiment, the reflection-reducing coating consists only of a material of moderate refractive index whose optical thickness is a quarter of the wavelength of the incident or emitted light or an odd-numbered multiple thereof. The optimum refractive index for the coating is calculated from the formula $n=\sqrt{n_1 * n_2}$, where $n_1$ is the refractive index of the phosphor and $n_2$ is that of the binder. A layer of this type consists, for example, of aluminium silicate or a mixture of aluminium oxide and $SiO_2$. The refractive index of the coating can be controlled via the ratio of the high- and low-refractive-index components.

In a further embodiment, the reflection-reducing coating consists of a multilayered arrangement of alternating layers of high and low refractive index. The optical thickness of the layers is adjusted so that the reflection is minimal at the wavelength of the incident light for stimulation of luminescence and/or the wavelength of the luminescence. This is the case, for example, if the optical thickness of the layers corresponds to a quarter of the wavelength of the light. The optimum geometrical thickness of the layers then arises from the formula $d=k*(\lambda/4 n_g)$, where d is the layer thickness, $\lambda$ is the wavelength of the light and $n_g$ is the refractive index of the layer and k is an odd integer, preferably 1. The layer thicknesses are preferably optimised so that the reflection is greatly reduced both at the excitation wavelength and at the emission wavelength. In order to optimise the overall result, the layer thicknesses can differ from the optimum layer thicknesses for the specific wavelengths of excitation and emission.

In this embodiment, high-refractive-index layers preferably consist of titanium dioxide, $SnO_2$ or $ZrO_2$, and low-refractive-index layers preferably consist of $SiO_2$ or $MgF_2$.

The phosphor particles are preferably coated by wet-chemical methods by precipitation of the metal oxides or hydroxides in aqueous suspension. To this end, the uncoated phosphor is suspended in water in a reactor and coated with the metal oxide or hydroxide by simultaneous metered addition of a metal salt and a precipitant with stirring.

As an alternative to metal salts, it is also possible to meter in organometallic compounds, for example metal alkoxides, which then form metal oxides or hydroxides by hydrolytic decomposition. Another possible way of coating the particles is coating by a sol-gel process in an organic solvent, such as, for example, ethanol or methanol. This process is particularly suitable for water-sensitive materials and for acid- or alkali-sensitive substances.

The present invention therefore furthermore relates to a process for the production of coated phosphor particles with at least one substantially transparent metal, transition-metal or semimetal oxide, characterised by the steps of:

a. Preparation of a pre-calcined phosphor precursor suspension by mixing at least two starting materials and at least one dopant and thermally treating the mixture at a temperature $T_1>150°$ C.

b. Subsequent calcination of the pre-calcined phosphor precursor mixture at a temperature $T_2>800°$ C. to give phosphor particles.

c. Coating of the phosphor particles with at least one, preferably substantially transparent, metal, transition-metal or semimetal oxide in a wet-chemical process and subsequent calcination.

The starting materials for the preparation of the phosphor consist, as mentioned above, of the base material (for example salt solutions of aluminium, yttrium and cerium) and at least one dopant, preferably europium or cerium, and optionally further Gd-, Lu-, Sc-, Sm-, Tb-, Pr- and/or Ga-containing materials. Suitable starting materials are inorganic and/or organic substances, such as nitrates, carbonates, hydrogencarbonates, phosphates, carboxylates, alcoholates, acetates, oxalates, halides, sulfates, organometallic compounds, hydroxides and/or oxides of the metals, semimetals, transition metals and/or rare-earth metals, which are dissolved and/or suspended in inorganic and/or organic liquids. Preference is given to the use of mixed nitrate solutions, chloride or hydroxide solutions which comprise the corresponding elements in the requisite stoichiometric ratio.

The substantially transparent oxides employed for the coating are preferably aluminium oxide, zinc oxide, titanium dioxide, zirconium oxide or silicon oxide, or combinations thereof. Aluminium oxide is particularly preferably employed.

Wet-chemical preparation generally has the advantage over the conventional solid-state diffusion (mixing and firing) method that the resultant materials have greater uniformity with respect to the stoichiometric composition, the particle size and the morphology of the particles from which the phosphor according to the invention is prepared.

For wet-chemical pretreatment of an aqueous precursor of the phosphors (=phosphor precursors) consisting, for example, of a mixture of yttrium nitrate, aluminium nitrate and cerium nitrate solution, the following known methods are preferred:

coprecipitation with an $NH_4HCO_3$ solution (see, for example, *Jander, Blasius Lehrbuch der analyt. u. präp. anorg. Chem. [Textbook of Analyt. and Prep. Inorg. Chem.]* 2002)

Pecchini method using a solution of citric acid and ethylene glycol (see, for example, *Annual Review of Materials Research Vol.* 36: 2006, 281-331)

combustion method using urea spray-drying of aqueous or organic salt solutions (starting materials)

spray pyrolysis of aqueous or organic salt solutions (starting materials)

In the above-mentioned coprecipitation, which is particularly preferred in accordance with the invention, an $NH_4HCO_3$ solution is added, for example, to chloride or nitrate solutions of the corresponding phosphor starting materials, resulting in the formation of the phosphor precursor.

In the Pecchini method, a precipitation reagent consisting of citric acid and ethylene glycol is added, for example, to the above-mentioned nitrate solutions of the corresponding phosphor starting materials at room temperature, and the mixture is subsequently heated. Increasing the viscosity results in phosphor precursor formation.

In the known combustion method, the above-mentioned nitrate solutions of the corresponding phosphor starting materials are, for example, dissolved in water, then boiled under reflux and treated with urea, resulting in the slow formation of the phosphor precursor.

Spray pyrolysis is one of the aerosol methods, which are characterised by spraying solutions, suspensions or dispersions into a reaction space (reactor) heated in various ways and the formation and deposition of solid particles. In contrast to spray-drying using hot-gas temperatures <200° C., thermal decomposition of the starting materials used (for example salts) and the re-formation of substances (for example oxides, mixed oxides) additionally occur, in addition to evaporation of the solvent, in spray pyrolysis as a high-temperature process.

The above-mentioned 5 method variants are described in detail in WO 2007/004488 (Merck), which is incorporated into the context of the present application in its full scope by way of reference.

The phosphors according to the invention can be prepared by various wet-chemical methods by
1) homogeneously precipitating the constituents, then separating off the solvent, followed by a single- or multistep thermal aftertreatment, where one of these steps may be carried out in a reducing atmosphere,
2) finely dividing the mixture, for example with the aid of a spray process, and removing the solvent, followed by a single- or multistep thermal aftertreatment, where one of these steps may be carried out in a reducing atmosphere, or
3) finely dividing the mixture, for example with the aid of a spray process, and removing the solvent in association with pyrolysis, followed by a single- or multistep thermal aftertreatment, where one of these steps may be carried out in a reducing atmosphere,
4) subsequently coating the resultant phosphors with the aid of wet-chemical methods 1-3.

The wet-chemical preparation of the phosphor is preferably carried out by the precipitation and/or sol-gel method.

In the above-mentioned thermal aftertreatment, it is preferred for the calcination to be carried out at least partly under reducing conditions (for example using carbon monoxide, forming gas, pure hydrogen, mixtures of hydrogen with an inert gas or at least a vacuum or oxygen-deficient atmosphere).

In general, it is also possible to prepare the uncoated phosphors according to the invention by the solid-state diffusion method, but this causes the disadvantages already mentioned.

The above-mentioned processes enable any desired outer shapes of the phosphor particles to be produced, such as spherical particles, flakes or structured materials and ceramics.

In addition, the phosphors according to the invention can be excited over a broad range, which extends from about 250 nm to 560 nm, preferably 380 nm to about 500 nm. These phosphors are thus suitable for excitation by UV or blue-emitting primary light sources, such as LEDs, or conventional discharge lamps (for example based on Hg).

The present invention furthermore relates to an illumination unit having at least one primary light source whose emission maximum or maxima is or are in the range 380 nm to 530 nm, preferably 430 nm to about 500 nm, particularly preferably 440 to 480 nm, where some or all of the primary radiation is converted into longer-wavelength radiation by the coated phosphors according to the invention. This illumination unit preferably emits white light or emits light having a certain colour point (colour-on-demand principle).

In a preferred embodiment of the illumination unit according to the invention, the light source is a luminescent indium aluminium gallium nitride, in particular of the formula $In_iGa_jAl_kN$, where $0 \leq i$, $0 \leq j$, $0 \leq k$, and $i+j+k=1$. Possible forms of light sources of this type are known to the person skilled in the art. They can be light-emitting LED chips having various structures.

In a further preferred embodiment of the illumination unit according to the invention, the light source is a luminescent arrangement based on ZnO, TCO (transparent conducting oxide), ZnSe or SiC or an arrangement based on an organic light-emitting layer (OLED).

In a further preferred embodiment of the illumination unit according to the invention, the light source is a source which exhibits electroluminescence and/or photoluminescence. The light source may furthermore also be a plasma or discharge source.

The phosphors according to the invention can either be dispersed in a resin (for example epoxy or silicone resin), arranged directly on the primary light source or, depending on the application, arranged remote therefrom (the latter arrangement also includes "remote phosphor technology"). The advantages of remote phosphor technology are known to the person skilled in the art and are revealed, for example, in the following publication: Japanese Journ. of Appl. Phys. Vol. 44, No. 21 (2005), L649-L651.

In a further embodiment, it is preferred for the optical coupling of the illumination unit between the coated phosphor and the primary light source to be achieved by means of a light-conducting arrangement. This enables the primary light source to be installed at a central location and to be optically coupled to the phosphor by means of light-conducting devices, such as, for example, light-conducting fibres. In this way, lamps matched to the illumination wishes and merely consisting of one or different phosphors, which may be arranged to form a light screen, and a light conductor, which is coupled to the primary light source, can be achieved. In this way, it is possible to position a strong primary light source at a location which is favourable for the electrical installation and to install lamps comprising phosphors which are coupled to the light conductors at any desired locations without further electrical cabling, but instead only by laying light conductors.

The present invention furthermore relates to the use of the phosphors according to the invention for partial or complete conversion of the blue or near-UV emission from a luminescent diode.

The phosphors according to the invention are furthermore preferably used for conversion of the blue or near-UV emission into visible white radiation. The phosphors according to the invention are furthermore preferably used for conversion of the primary radiation into a certain colour point by the "colour-on-demand" concept.

The present invention furthermore relates to the use of the phosphors according to the invention in electroluminescent materials, such as, for example, electroluminescent films (also known as lighting films or light films), in which, for example, zinc sulfide or zinc sulfide doped with $Mn^{2+}$, $Cu^+$ or $Ag^+$ is employed as emitter, which emit in the yellow-green region. The areas of application of the electroluminescent film are, for example, advertising, display backlighting in liquid-crystal display screens (LC displays) and thin-film transistor (TFT) displays, self-illuminating vehicle license plates, floor graphics (in combination with a crush-resistant and slip-proof laminate), in display and/or control elements, for example in automobiles, trains, ships and aircraft, or also domestic appliances, garden equipment, measuring instruments or sport and leisure equipment.

The following examples are intended to illustrate the present invention. However, they should in no way be regarded as limiting. All compounds or components which can be used in the compositions are either known and commercially available or can be synthesised by known methods. The temperatures indicated in the examples are always given in ° C. It furthermore goes without saying that, both in the description and also in the examples, the added amounts of the components in the compositions always add up to a total of 100%. Percentage data given should always be regarded in the given connection. However, they usually always relate to the weight of the part-amount or total amount indicated.

EXAMPLES

Example 1

Coating of Ruby Flakes $Al_{1.991}O_3:Cr_{0.009}$ with Aluminium Oxide 223.8 g of aluminium sulfate 18-hydrate, 114.5 g of sodium sulfate, 93.7 g of potassium sulfate and 2.59 g of $KCr(SO_4)_2 \times 12H_2O$ (chrome alum) are dissolved in 450 ml of deionised water at about 75° C. 2.0 g of a 34.4% titanium sulfate solution are added to this mixture, giving aqueous solution (a). 0.9 g of trisodium phosphate 12-hydrate and 107.9 g of sodium carbonate are dissolved in 250 ml of deionised water, giving aqueous solution (b). The two aqueous solutions (a) and (b) are added simultaneously to 200 ml of deionised water with stirring over the course of 15 min. The mixture is stirred for a further 15 min.

The resultant solution is evaporated to dryness and treated at a temperature of 800° C. for one hour in an air atmosphere, giving the ruby flakes. 75 g of a filter cake which comprises 50 g of chromium-doped aluminium oxide particles (ruby phosphors) and 25 g of residual moisture are suspended in 925 g of deionised water in a glass reactor with heating mantle. 600 g of an aqueous solution which comprises 98.7 g of $AlCl_3 \cdot 6H_2O$ per kg of solution are metered into the suspension over the course of 2½ hours with stirring at 80° C. The pH is kept constant at 6.5 by metered addition of sodium hydroxide solution. When the metered addition is complete, the mixture is stirred at 80° C. for a further 1 hour, then cooled to room temperature, and the phosphor is filtered off, washed with water and dried. Finally, the dried phosphor is calcined at 750° C. for 30 min and finally sieved through a 50μ sieve.

Without further treatment, the product disintegrates to give a fine powder which falls through the sieve in a short time leaving virtually no residue, giving 61 g of the coated phosphor, about 98% of theory.

Example 2

Coating of Ruby Flakes $Al_{1.991}O_3:Cr_{0.009}$ with Aluminium Oxide and Silicon Oxide 75 g of a filter cake which comprises 50 g of chromium-doped aluminium oxide particles (ruby phosphors) and 25 g of residual moisture are suspended in 925 g of deionised water in a glass reactor with heating mantle. 600 g of an aqueous solution which comprises 98.7 g of $AlCl_3 \cdot 6H_2O$ per kg of solution are metered into the suspension with stirring at 80° C. at a rate of 4 ml/min. During this addition, the pH is kept constant at 6.5 by metered addition of sodium hydroxide solution. When the metered addition is complete, the mixture is stirred at 80° C. for a further 1 hour, then the pH is adjusted to 7.5, and 80 g of sodium water-glass (adjusted to 12.5% by weight of $SiO_2$) are metered in at 0.75 ml/min. During this addition, the pH is kept constant using hydrochloric acid. When the water-glass has been metered in, the mixture is stirred at the precipitation temperature for a further one hour and cooled to room temperature. The resultant product is filtered off, washed with water and dried. Finally, the dried phosphor is calcined at 750° C. for 30 min and finally sieved through a 50μ sieve. Without further treatment, the product disintegrates to give a fine powder which falls through the sieve in a short time leaving virtually no residue, giving 70 g of phosphor, about 96.5% of theory.

Example 3

Coating of Ruby Flakes $Al_{1.991}O_3:Cr_{0.009}$ with Silica 50 g of the product from Example 1 are suspended in 1 liter of ethanol in a 2 l reactor with ground-glass lid, heating mantle and reflux condenser. A solution of 17 g of ammonia water (25% by weight of $NH_3$) in 170 g of water is added. A solution of 48 g of tetraethyl orthosilicate (TEOS) in 48 g of anhydrous ethanol is slowly added dropwise (about 1 ml/min) with stirring at 65° C. When the addition is complete, the suspension is stirred for a further 2 hours, brought to room temperature and filtered. The residue is washed with ethanol, dried, subsequently calcined and sieved, giving 63 g (about 98% of theory) of a matt powder having a pale-violet colour.

Example 4

Coating of the Phosphor YAG:Ce with Aluminium Oxide 75 g of a filter cake which comprises 50 g of YAG:Ce and 25 g of residual moisture are suspended in 925 g of deionised water in a glass reactor with heating mantle. 600 g of an aqueous solution which comprises 98.7 g of $AlCl_3 \cdot 6H_2O$ per kg of solution are metered into the suspension over the course of 2½ hours with stirring at 80° C. During this addition, the pH is kept constant at 6.5 by metered addition of sodium hydroxide solution. When the metered addition is complete, the mixture is stirred at 80° C. for a further 1 hour, then cooled to room temperature, and the phosphor is filtered off, washed with water and dried. The dried phosphor is finally calcined at 750° C. for 30 min and finally sieved through a 50μ sieve.

Example 5

Coating of the Phosphor $(Ca,Sr,Ba)SiN_2:Eu$ with Aluminium Oxide 75 g of a filter cake which comprises 50 g of $(Ca,Sr,Ba)SiN_2:Eu$ and 25 g of residual moisture are suspended in 925 g of deionised water in a glass reactor with heating mantle. 600 g of an aqueous solution which comprises 98.7 g of $AlCl_3 \cdot 6H_2O$ per kg of solution are metered into the suspension over the course of 2½ hours with stirring at 80° C. During this addition, the pH is kept constant at 6.5 by metered addition of sodium hydroxide solution. When the metered addition is complete, the mixture is stirred at 80° C. for a further 1 hour, then cooled to room temperature, and the phosphor is filtered off, washed with water and dried. Finally, the dried phosphor is calcined at 750° C. for 30 min and finally sieved through a 50µ sieve.

Example 6

Coating of the Phosphor $(Ca,Sr,Ba)_2Si_2N_8$:Eu with Aluminium Oxide 75 g of a filter cake which comprises 50 g of $(Ca,Sr,Ba)_2Si_2N_8$:Eu and 25 g of residual moisture are suspended in 925 g of deionised water in a glass reactor with heating mantle. 600 g of an aqueous solution which comprises 98.7 g of $AlCl_3*6H_2O$ per kg of solution are metered into the suspension over the course of 2½ hours with stirring at 80° C. During this addition, the pH is kept constant at 6.5 by metered addition of sodium hydroxide solution. When the metered addition is complete, the mixture is stirred at 80° C. for a further 1 hour, then cooled to room temperature, and the phosphor is filtered off, washed with water and dried. Finally, the dried phosphor is calcined at 750° C. for 30 min and finally sieved through a 50µ sieve.

Example 7

Coating of the Phosphor YAG:Ce with $SiO_2$ 50 g of YAG:Ce are suspended in 1 liter of ethanol in a 2 l reactor with ground-glass lid, heating mantle and reflux condenser. A solution of 17 g of ammonia water (25% by weight of $NH_3$) in 170 g of water is added. A solution of 48 g of tetraethyl orthosilicate (TEOS) in 48 g of anhydrous ethanol is slowly added dropwise (about 1 ml/min) with stirring at 65° C. When the addition is complete, the suspension is stirred for a further 2 hours, brought to room temperature and filtered. The residue is washed with ethanol, dried, subsequently calcined and sieved.

Example 8

Coating of the Phosphor (Ca,Sr,Ba)$SiN_2$:Eu with $SiO_2$ 50 g of (Ca,Sr,Ba)$SiN_2$:Eu are suspended in 1 liter of ethanol in a 2 l reactor with ground-glass lid, heating mantle and reflux condenser. A solution of 17 g of ammonia water (25% by weight of $NH_3$) in 170 g of water is added. A solution of 48 g of tetraethyl orthosilicate (TEOS) in 48 g of anhydrous ethanol is slowly added dropwise (about 1 ml/min) with stirring at 65° C. When the addition is complete, the suspension is stirred for a further 2 hours, brought to room temperature and filtered. The residue is washed with ethanol, dried, subsequently calcined and sieved.

Example 9

Coating of the Phosphor $(Ca,Sr,Ba)_2Si_5N_8$:Eu with $SiO_2$ 50 g of $(Ca,Sr,Ba)_2Si_5N_8$:Eu are suspended in 1 liter of ethanol in a 2 l reactor with ground-glass lid, heating mantle and reflux condenser. A solution of 17 g of ammonia water (25% by weight of $NH_3$) in 170 g of water is added. A solution of 48 g of tetraethyl orthosilicate (TEOS) in 48 g of anhydrous ethanol is slowly added dropwise (about 1 ml/min) with stirring at 65° C. When the addition is complete, the suspension is stirred for a further 2 hours, brought to room temperature and filtered. The residue is washed with ethanol, dried, subsequently calcined and sieved.

Example 10

Coating of the Phosphor YAG:Ce with a Mixture of $Al_2O_3$ and $SiO_2$ 75 g of a filter cake which comprises 50 g of YAG:Ce and 25 g of residual moisture are suspended in 925 g of deionised water in a glass reactor with heating mantle. 600 g of an aqueous solution which comprises 98.7 g of $AlCl_3*6H_2O$ per kg of solution are metered into the suspension with stirring at 80° C. at a rate of 4 ml/min. During this addition, the pH is kept constant at 6.5 by metered addition of sodium hydroxide solution. When the metered addition is complete, the mixture is stirred at 80° C. for a further 1 hour, then the pH is adjusted to 7.5, and 80 g of sodium water-glass (adjusted to 12.5% by weight of $SiO_2$) are metered in at 0.75 ml/min. During this addition, the pH is kept constant using hydrochloric acid. When the water-glass has been metered in, the mixture is stirred at the precipitation temperature for a further one hour and cooled to room temperature. The resultant product is filtered off, washed with water and dried. The dried phosphor is subsequently calcined at 750° C. for 30 min and finally sieved through a 50µ sieve.

Example 11

Coating of the Phosphor (Ca,Sr,Ba)$SiN_2$:Eu with a Mixture of $Al_2O_3$ and $SiO_2$ 75 g of a filter cake which comprises 50 g of (Ca,Sr,Ba)$SiN_2$:Eu and 25 g of residual moisture are suspended in 925 g of deionised water in a glass reactor with heating mantle. 600 g of an aqueous solution which comprises 98.7 g of $AlCl_3*6H_2O$ per kg of solution are metered into the suspension with stirring at 80° C. at a rate of 4 ml/min. During this addition, the pH is kept constant at 6.5 by metered addition of sodium hydroxide solution. When the metered addition is complete, the mixture is stirred at 80° C. for a further 1 hour, then the pH is adjusted to 7.5, and 80 g of sodium water-glass (adjusted to 12.5% by weight of $SiO_2$) are metered in at 0.75 ml/min. During this addition, the pH is kept constant using hydrochloric acid. When the water-glass has been metered in, the mixture is stirred at the precipitation temperature for a further one hour and cooled to room temperature. The resultant product is filtered off, washed with water and dried. The dried phosphor is subsequently calcined at 750° C. for 30 min and finally sieved through a 50µ sieve.

Example 12

Coating of the Phosphor $(Ca,Sr,Ba)_2Si_5N_8$:Eu with a Mixture of $Al_2O_3$ and $SiO_2$ 75 g of a filter cake which comprises 50 g of $(Ca,Sr,Ba)_2Si_5N_8$:Eu and 25 g of residual moisture are suspended in 925 g of deionised water in a glass reactor with heating mantle. 600 g of an aqueous solution which comprises 98.7 g of $AlCl_3*6H_2O$ per kg of solution are metered into the suspension with stirring at 80° C. at a rate of 4 ml/min. During this addition, the pH is kept constant at 6.5 by metered addition of sodium hydroxide solution. When the metered addition is complete, the mixture is stirred at 80° C. for a further 1 hour, then the pH is adjusted to 7.5, and 80 g of sodium water-glass (adjusted to 12.5% by weight of $SiO_2$) are metered in at 0.75 ml/min. During this addition, the pH is kept constant using hydrochloric acid. When the water-glass has been metered in, the mixture is stirred at the precipitation temperature for a further one hour and cooled to room temperature. The resultant product is filtered off, washed with water and dried. The dried phosphor is subsequently calcined at 750° C. for 30 min and finally sieved through a 50μ sieve.

DESCRIPTION OF THE FIGURES

The invention will be explained in greater detail below with reference to a number of working examples, in which.

Figure 1:
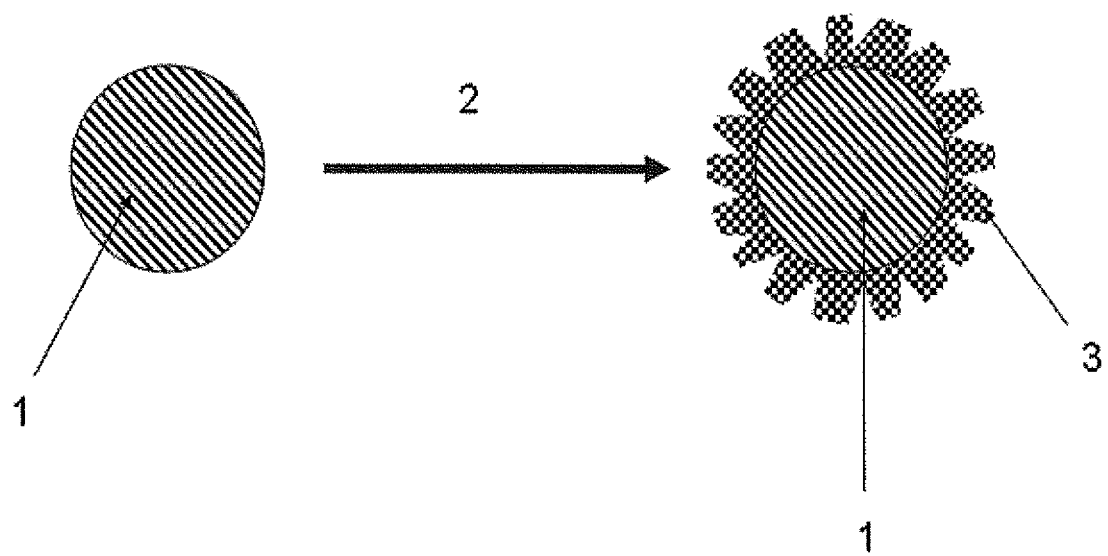
FIG. 1 shows the phosphor particle (1) provided with a coating (3) becoming more porous towards the outside in a wet-chemical process (2). The totality of (1)+(3) represents the novel phosphor material.
Figure 2:
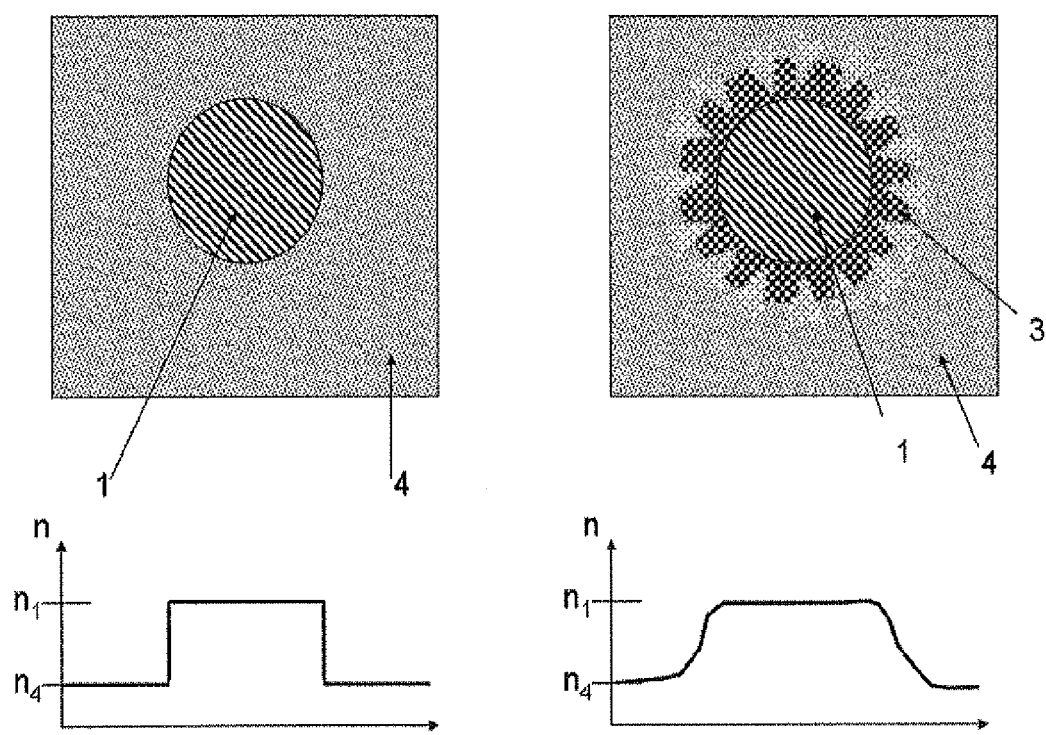
FIG. 2 shows on the left the uncoated phosphor (1) in the resin matrix (4); in the case of conventional silicone resin having a refractive index n=1.38 to 1.5, a refractive-index jump from the low-refractive-index resin ($n_4$) to the high-refractive-index phosphor ($n_1$) arises at the interface between resin and phosphor. This results in a large proportion of the excitation light being scattered at the interface and a large proportion of the light generated in the phosphor being prevented from coupling out owing to total reflection. The novel phosphor material according to the invention is drawn in the right-hand part: the novel phosphor material is formed from the phosphor (1) by firmly bonding a porous coating (3) to the surface via chemical links. The coating causes a gradual transition between the refractive index of the high-refractive-index phosphor ($n_1$) and the refractive index of the low-refractive-index resin ($n_4$). Consequently, less excitation light is scattered, and total reflection is reduced, i.e. the phosphor can absorb more light and couple out more fluorescence light.
Figure 3:
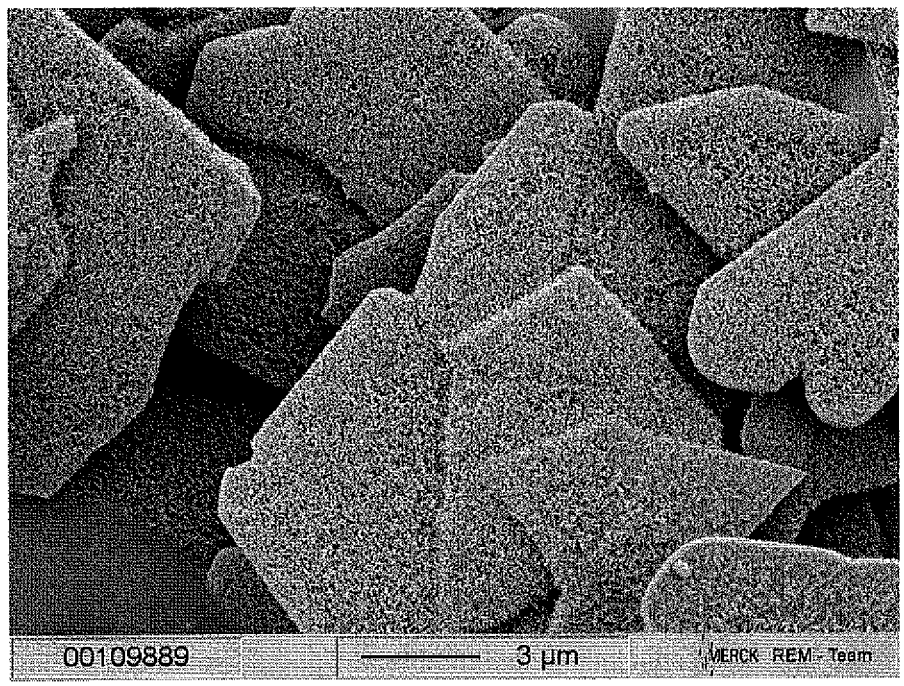
FIG. 3 shows an SEM photograph of an alumina-coated phosphor $Al_2O_3:Cr^{3+}$ having a porous surface.
Figure 4:
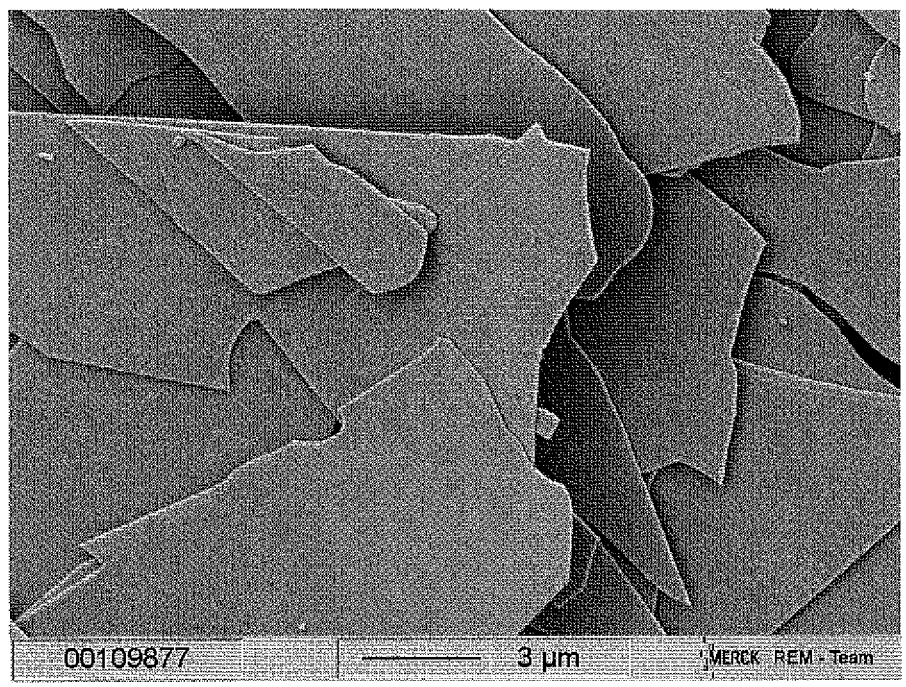
FIG. 4 shows an SEM photograph of a phosphor $Al_2O_3$: $Cr^{3+}$ coated with a mixed precipitation of $Al_2O_3$ and $SiO_2$ having a refractive-index gradient from pure aluminium oxide (about 1.78) to $SiO_2$ (about 1.4).

The invention claimed is:

1. Coated phosphor particles comprising:
   luminescent particles and at least one coating of at least one metal, transition-metal or semimetal oxide, wherein the coating has a refractive-index gradient from inside to outside, with the higher refractive index being on the inside and the lower refractive index being on the outside, wherein the surface of the coated phosphor particles is porous,
   wherein said refractive-index gradient provides a gradual transition from said higher refractive index to said lower refractive index.

2. The coated phosphor particles according to claim 1, wherein each luminescent particle comprises at least one luminescent compound selected from $(Y,Gd,Lu,Sc,Sm,Tb)_3(Al,Ga)_5O_{12}$:Ce (with or without Pr), $YSiO_2N$:Ce, $Y_2Si_3O_3N_4$:Ce, $Gd_2Si_3O_3N_4$:Ce, $(Y,Gd,Tb,Lu)_3Al_{5-x}Si_xO_{12-x}N_x$:Ce, $BaMgAl_{10}O_{17}$:Eu (with or without Mn), $SrAl_2O_4$:Eu, $Sr_4Al_{14}O_{25}$:Eu, $(Ca,Sr,Ba)Si_2N_2O_2$:Eu, $SrSiAl_2O_3N_2$:Eu, $(Ca,Sr,Ba)_2Si_5N_8$:Eu, $(Ca,Sr,Ba)SiN_2$:Eu, $CaAlSiN_3$:Eu, $(Ca,Sr,Ba)_2SiO_4$:Eu and other silicates, molybdates, tungstates, vanadates, group III nitrides, oxides, in each case individually or mixtures thereof with one or more activator ions selected from Ce, Eu, Mn, Cr, Tb and/or Bi.

3. The coated phosphor particles according to claim 2, wherein said at least one luminescent compound is:
   $(Y,Gd,Lu,Sc,Sm,Tb)_3(Al,Ga)_5O_{12}$:Ce, with or without Pr,
   $YSiO_2N$:Ce,
   $Y_2Si_3O_3N_4$:Ce,
   $Gd_2Si_3O_3N_4$:Ce,
   $(Y,Gd,Tb,Lu)_3Al_{5-x}Si_xO_{12-x}N_x$:Ce,
   $BaMgAl_{10}O_{17}$:Eu, with or without Mn,
   $SrAl_2O_4$:Eu, $Sr_4Al_{14}O_{25}$:Eu,
   $(Ca,Sr,Ba)Si_2N_2O_2$:Eu,
   $SrSiAl_2O_3N_2$:Eu,
   $(Ca,Sr,Ba)_2Si_5N_8$:Eu,
   $(Ca,Sr,Ba)SiN_2$:Eu,
   $CaAlSiN_3$:Eu, or
   $(Ca,Sr,Ba)_2SiO_4$:Eu.

4. The coated phosphor particles according to claim 1, wherein the particle size of the phosphor particles is between 1 and 40 μm.

5. The coated phosphor particles according to claim 1, wherein the metal, transition-metal or semimetal oxide coating is substantially transparent.

6. A process for production of coated phosphor particles according to claim 1, said process comprising:
   a) preparing a pre-calcined phosphor precursor suspension by mixing at least two starting materials and at least one dopant and thermally treating the resultant mixture at a temperature $T_1 > 150°$ C.;
   b) subsequently calcining the pre-calcined phosphor precursor mixture at a temperature $T_2 > 800°$ C. to give phosphor particles;
   c) coating the phosphor particles with at least one metal, transition-metal or semimetal oxide in a wet-chemical process and subsequently subjecting the resultant coated phosphor particles to calcination.

7. The process according to claim 6, wherein the metal, transition-metal or semimetal oxide is substantially transparent.

8. The process according to claim 6, wherein the metal, transition-metal or semimetal oxide coating is in the form of nanoparticles of aluminium oxide, zirconium oxide, zinc oxide, titanium oxide, silicon oxide or combinations thereof.

9. The process according to claim 6, wherein the phosphor is prepared by wet-chemical methods from organic and/or inorganic metal, semimetal, transition-metal and/or rare-earth metal salts by means of sol-gel processes and/or precipitation processes.

10. The process according to claim 9, wherein the wet-chemical preparation of the phosphor precursors is selected from one of the following methods:
    coprecipitation with an $NH_4HCO_3$ solution
    Pecchini method with a solution of citric acid and ethylene glycol
    combustion method using urea
    spray-drying of the dispersed starting materials
    spray pyrolysis of the dispersed starting materials.

11. The process according to claim 10, wherein the wet-chemical preparation of the phosphor precursors is carried out by means of coprecipitation with an $NH_4HCO_3$ solution.

12. The process according to claim 6, wherein the coating is carried out with at least one metal, transition-metal or semimetal oxide by addition of aqueous or non-aqueous solutions of non-volatile salts and/or organometallic compounds.

13. The process according to claim 6, wherein the starting materials and the dopant are inorganic and/or organic substances, such as nitrates, carbonates, hydrogencarbonates, phosphates, carboxylates, alcoholates, acetates, oxalates, halides, sulfates, organometallic compounds, hydroxides and/or oxides of the metals, semimetals, transition metals and/or rare-earth metals, which are dissolved and/or suspended in inorganic and/or organic liquids.

14. The process according to claim 6, wherein the phosphor particles comprise at least one of the following phosphor materials: $(Y,Gd,Lu,Sc,Sm,Tb,Th,Ir,Sb,Bi)_3(Al,Ga)_5O_{12}$:Ce (with or without Pr), $YSiO_2N$:Ce, $Y_2Si_3O_3N_4$:Ce, $Gd_2Si_3O_3N_4$:Ce, $(Y,Gd,Tb,Lu)_3Al_{5-x}Si_xO_{12-x}N_x$:Ce, $BaMgAl_{10}O_{17}$:Eu (with or without Mn), $SrAl_2O_4$:Eu, $Sr_4Al_{14}O_{25}$:Eu, $(Ca,Sr,Ba)Si_2N_2O_2$:Eu, $SrSiAl_2O_3N_2$:Eu, $(Ca,Sr,Ba)_2Si_5N_8$:Eu, $(Ca,Sr,Ba)SiN_2$:Eu, $CaAlSiN_3$:Eu, $(Ca,Sr,Ba)_2SiO_4$:Eu and other silicates, molybdates, tungstates, vanadates, group III nitrides, oxides, in each case individually or mixtures thereof with one or more activator ions, selected from Ce, Eu, Mn, Cr, Tb and/or Bi.

15. An illumination unit having at least one primary light source whose emission maximum is in the range 250 nm to 530 nm, where some or all of this radiation is converted into longer-wavelength radiation by coated phosphor particles according to claim 1.

16. The illumination unit according to claim 15, wherein the light source is a luminescent indium aluminium gallium nitride, in particular of the formula $In_iGa_jAl_kN$, where $0 \leq i$, $0 \leq j$, $0 \leq k$, and $i+j+k=1$.

17. The illumination unit according to claim 15, wherein the light source is a luminescent compound based on ZnO, TCO (transparent conducting oxide), ZnSe or SiC.

18. The illumination unit according to claim 15, wherein the light source is a material based on an organic light-emitting layer.

19. The illumination unit according to claim 15, wherein the light source is a source which exhibits electroluminescence and/or photoluminescence.

20. The illumination unit according to claim 15, wherein the light source is a plasma or discharge source.

21. The illumination unit according to claim 15, wherein said primary light source has an emission maximum in the range of 380 nm and 500 nm.

22. A method of using coated phosphor particles according to claim 1 for partial or complete conversion of the blue or near-UV emission from a luminescent diode.

23. The coated phosphor particles according to claim 1, wherein the surface of the coated phosphor particles is mesoporous.

24. The coated phosphor particles according to claim 1, wherein the surface of the coated phosphor particles is macroporous.

25. The coated phosphor particles according to claim 1, wherein the thickness of the coating is between 10 nm and 200 nm.

26. The coated phosphor particles according to claim 1, wherein the metal, transition-metal or semimetal oxide coating contains at least two components, a component A having a higher refractive index and a component B having a lower refractive index.

27. The coated phosphor particles according to claim 26, wherein component A is $Al_2O_3$, ZnO, or $ZrO_2$ and component B is $SiO_2$.

28. Coated phosphor particles comprising:

luminescent particles and at least one coating of at least one metal, transition-metal or semimetal oxide, wherein said coating contains at least two components of different refractive index, wherein the coating has a refractive-index gradient from inside to outside, with the higher refractive index being on the inside and the lower refractive index being on the outside, wherein the surface of the coated phosphor particles is porous, said refractive-index gradient being formed by a composition gradient within said coating wherein the component of said at least two components having the higher refractive index essentially forms a first surface of the coating, adjacent the surface of each of said particles, and the component of said at least two components having the lower refractive index essentially forms a second surface which is the outside surface of said coating, and in between said first and second surfaces there is a mixture of the at least two components, with said mixture exhibiting a composition gradient.

\* \* \* \* \*